US012345553B2

(12) United States Patent
Furukawa et al.

(10) Patent No.: US 12,345,553 B2
(45) Date of Patent: Jul. 1, 2025

(54) ANGLE DETECTION DEVICE

(71) Applicant: Mitsubishi Electric Corporation, Tokyo (JP)

(72) Inventors: Akira Furukawa, Tokyo (JP); Tatsuya Mori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 649 days.

(21) Appl. No.: 17/442,706

(22) PCT Filed: Jul. 4, 2019

(86) PCT No.: PCT/JP2019/026583
§ 371 (c)(1),
(2) Date: Sep. 24, 2021

(87) PCT Pub. No.: WO2020/213181
PCT Pub. Date: Oct. 22, 2020

(65) Prior Publication Data
US 2022/0120590 A1  Apr. 21, 2022

(30) Foreign Application Priority Data
Apr. 19, 2019 (JP) ................................ 2019-079808

(51) Int. Cl.
*G01D 5/244* (2006.01)
(52) U.S. Cl.
CPC ....... *G01D 5/24428* (2013.01); *G01D 5/2448* (2013.01)

(58) Field of Classification Search
CPC .. G01D 5/24428; G01D 5/243; G01D 5/2448; G01D 5/24471; G01D 5/145;
(Continued)

(56) References Cited

U.S. PATENT DOCUMENTS

2008/0116886 A1  5/2008  Yamada et al.
2010/0045227 A1  2/2010  Ura et al.
(Continued)

FOREIGN PATENT DOCUMENTS

CN  107402025 A  11/2017
CN  108139232 A  6/2018
(Continued)

OTHER PUBLICATIONS

Chinese Office Action issued Nov. 9, 2023 in Patent Application No. 201980095191.5.
(Continued)

*Primary Examiner* — Daniel R Miller
*Assistant Examiner* — Eric Sebastian Von Wald
(74) *Attorney, Agent, or Firm* — Sughrue Mion, PLLC

(57) ABSTRACT

There has been a problem that a rotation second-order angle error due to a phase difference between a sine signal and a cosine signal deviating from $\pi/2$ cannot be reduced. Therefore, provided is an angle detection device that can suppress a second-order angle error caused due to the phase difference between a first sine signal and a second sine signal deviating from $\pi/2$, by calculating a detection angle from a first detection signal based on the sum of two sine signals having different phases and a second detection signal based on the difference of the two sine signals.

11 Claims, 8 Drawing Sheets

(58) Field of Classification Search
CPC ........ G01D 3/036; G01D 3/028; G01D 18/00;
G01D 18/002; G01D 18/004; G01D
18/006; G01D 18/008; G01D 5/14; G01D
5/12; H02P 6/16
See application file for complete search history.

(56) References Cited

U.S. PATENT DOCUMENTS

| | | | |
|---|---|---|---|
| 2013/0099708 | A1 | 4/2013 | Shimizu et al. |
| 2015/0308858 | A1* | 10/2015 | Furuse .................. G01R 25/00 |
| | | | 324/207.2 |
| 2016/0216132 | A1* | 7/2016 | Ausserlechner ......... G01D 5/14 |
| 2016/0288823 | A1* | 10/2016 | Mikamo ............ G01D 5/24461 |
| 2017/0005604 | A1* | 1/2017 | Kaiser ...................... H02P 6/16 |
| 2017/0045375 | A1* | 2/2017 | Angelis ................ G01D 5/2454 |
| 2017/0336229 | A1 | 11/2017 | Watanabe et al. |
| 2018/0095146 | A1 | 4/2018 | Uchida et al. |
| 2018/0172485 | A1* | 6/2018 | Lechner ................... G01D 5/20 |
| 2018/0245914 | A1 | 8/2018 | Furukawa et al. |
| 2019/0003856 | A1* | 1/2019 | Kawakami ............... H02P 6/16 |
| 2019/0033097 | A1* | 1/2019 | Sorensen ............... G01D 5/145 |
| 2019/0074780 | A1* | 3/2019 | Furukawa ................ G01D 5/12 |
| 2020/0309871 | A1 | 10/2020 | Watanabe et al. |

FOREIGN PATENT DOCUMENTS

| | | | |
|---|---|---|---|
| JP | 60-170710 | A | 9/1985 |
| JP | 2003009565 | A * | 1/2003 |
| JP | 2008-134215 | A | 6/2008 |
| JP | 2008-273478 | A | 11/2008 |
| JP | 2010-048760 | A | 3/2010 |
| JP | 2013-108971 | A | 6/2013 |
| JP | 2015-206614 | A | 11/2015 |
| JP | 2017-125866 | A | 7/2017 |
| JP | 2017-151061 | A | 8/2017 |
| JP | 2018-054584 | A | 4/2018 |

OTHER PUBLICATIONS

International Search Report for PCT/JP2019/026583 dated Aug. 6, 2019 [PCT/ISA/210].
Chinese Office Action issued Jun. 21, 2023, in Application No. 201980095191.5.
Extended European Search Report dated May 11, 2022, issued in European Application No. 19925337.8.

* cited by examiner

ANGLE DETECTION DEVICE

CROSS REFERENCE TO RELATED APPLICATIONS

This application is a National Stage of International Application No. PCT/JP2019/026583 filed Jul. 4, 2019, claiming priority based on Japanese Patent Application No. 2019-079808 filed Apr. 19, 2019.

TECHNICAL FIELD

The present disclosure relates to an angle detection device.

BACKGROUND ART

In order to provide a motor having reduced torque ripple, detection accuracy of rotation position of a rotor is required to be improved. In the electric power steering control device of Patent Document 1, a detection signal is corrected using a midpoint correction value, of a sine signal and a cosine signal of a resolver, stored in an EEPROM (Electrically Erasable Programmable Read-Only-Memory) or the like in advance, whereby a rotation first-order angle error caused due to a rotation 0-order signal error is reduced. In addition, the sine signal and the cosine signal of the resolver that have been subjected to the midpoint correction are multiplied, to be corrected, by an amplitude correction coefficient stored in an EEPROM or the like in advance, whereby a rotation second-order angle error caused due to a rotation first-order signal error is reduced (see Patent Document 1, for example).

CITATION LIST

Patent Document

Patent Document 1: Japanese Laid-Open Patent Publication No. 2008-273478

SUMMARY OF THE INVENTION

Problems to be Solved by the Invention

When the method according to Patent Document 1 is used, a rotation first-order angle error caused due to an offset error included in a sine signal and a cosine signal, or a rotation second-order angle error caused due to an amplitude ratio can be reduced. However, a rotation second-order angle error due to a phase difference between the sine signal and the cosine signal deviating from $\pi/2$ cannot be reduced.

The present disclosure has been made in order to solve the above problem. An object of the present disclosure is to provide an angle detection device that can reduce a rotation second-order angle error due to the phase difference between a sine signal and a cosine signal deviating from $\pi/2$.

Solution to the Problems

An angle detection device according to the present disclosure includes:
- an angle detector for detecting a first sine signal and a second sine signal having a phase different from that of the first sine signal, in accordance with rotation of a rotating machine;
- a detection signal calculation unit for outputting a first detection signal based on a sum of the first sine signal and the second sine signal, and a second detection signal based on a difference between the first sine signal and the second sine signal; and
- an angle calculation unit for calculating a detection angle on the basis of the first detection signal and the second detection signal, wherein
- a second-order angle error caused due to a phase difference between the first sine signal and the second sine signal deviating from $\pi/2$ is suppressed.

Effect of the Invention

According to the angle detection device of the present disclosure, a detection angle is calculated using the sum and the difference of two sine signals having different phases, whereby occurrence of a rotation second-order angle error due to the phase difference between the two sine signals can be suppressed.

BRIEF DESCRIPTION OF THE DRAWINGS

FIG. 1A is a top view and FIG. 1B is a side view.

In FIG. 4A, the horizontal axis represents sensor angle. In FIG. 4B, the horizontal axis represents order number.

DESCRIPTION OF EMBODIMENTS

Figure 1A:
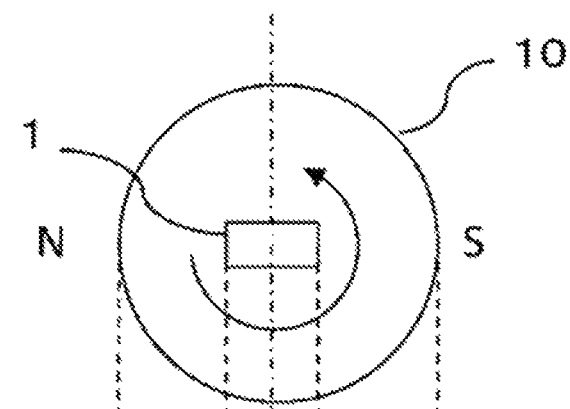
FIG. 1A and 1B are schematic diagram showing a positional relationship between an angle detector and a sensor magnet according to embodiment 1.

Hereinafter, a suitable embodiment of a power control device according to the present disclosure will be described with reference to the drawings. It is noted that the same components and corresponding parts are denoted by the same reference characters, and the detailed description thereof is omitted. Also, in the other embodiments, components denoted by the same reference characters will not be repeatedly described.

Embodiment 1

Examples of an angle detector 1 used in an angle detection device of the present disclosure include a resolver, a sensor using a magneto-resistive element (MR sensor), an encoder, a Hall element, and the like. Since similar effects can be obtained in each case, description herein is given using an MR sensor as an example.

Figure 1B:
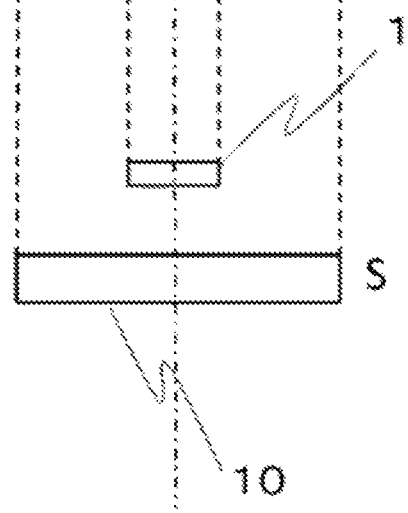

FIG. 1A and 1B are schematic diagram showing a positional relationship between the angle detector 1 and a sensor magnet 10 according to embodiment 1. FIG. 1A is a top view and FIG. 1B is a side view. The angle detector 1 detects a magnetic field generated by the sensor magnet 10, and outputs a first sine signal V sin 1 and a second sine signal V sin 2. Since the sensor magnet 10 rotates together with a rotor (not shown), the magnetic field generated in the angle detector 1 by the sensor magnet 10 changes in accordance with an angle.

Figure 2:
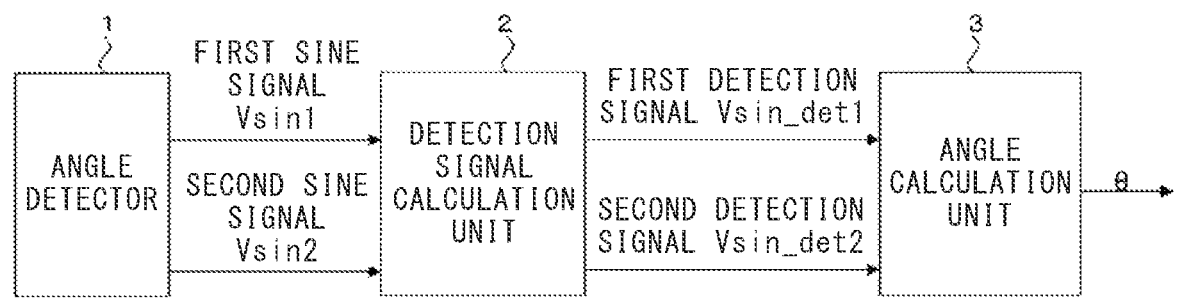
FIG. 2 is a block configuration diagram showing a configuration of an angle detection device in embodiment 1.

FIG. 2 is a block configuration diagram showing a configuration of the angle detection device in embodiment 1 of the present disclosure. The angle detector 1 outputs the first sine signal V sin 1 and the second sine signal V sin 2 on the basis of the magnetic field, of the sensor magnet 10, that changes in accordance with the angle of the rotor. The first sine signal V sin 1 and the second sine signal V sin 2 are sine waves having different phases represented by formula (1) below. θs represents a sensor angle, a1 represents an amplitude, γ represents a phase difference, and Vc represents a DC voltage supplied to the angle detector. Here, the amplitude ratio between the first sine signal V sin 1 and the second sine signal V sin 2 is 1. However, when the amplitude is different, correction may be performed such that the amplitude ratio becomes 1.

[Math. 1]

$$\begin{cases} V_{sin1} = a_1\cos\theta_s + V_c/2 \\ V_{sin2} = a_1\cos(\theta_s + \gamma) + V_c/2 \end{cases} \quad (1)$$

A detection signal calculation unit 2 outputs a first detection signal V sin_det1 and a second detection signal V sin_det2 according to formula (2), using the first sine signal V sin 1 and the second sine signal V sin 2 obtained by the angle detector 1. The first detection signal V sin_det1 is obtained by subtracting a DC voltage Vc supplied to the angle detector, from the sum of the first sine signal V sin 1 and the second sine signal V sin 2.

The second detection signal V sin_det2 is obtained by subtracting the second sine signal V sin 2 from the first sine signal V sin 1. Here, as a subtraction term for reducing an angle error due to a so-called phase difference deviation, a value that is twice Vc/2, which is the midpoint voltage of the first sine signal V sin 1, i.e., the DC voltage Vc supplied to the angle detector, is used. However, when the midpoint voltage is not Vc/2, if a value that suits such a case is used, similar effects can be obtained. When variations are caused due to environmental temperature, aged deterioration, and the like, a value in consideration of such variations may be used. This value may be set or updated online.

[Math. 2]

$$\begin{cases} V_{sin\_det1} = V_{sin1} + V_{sin2} - V_c = \sqrt{2}\sqrt{1+\cos\gamma}\, a_1\cos(\theta_s - \xi_1) \\ V_{sin\_det2} = V_{sin1} - V_{sin2} = \sqrt{2}\sqrt{1-\cos\gamma}\, a_1\cos(\theta_s - \xi_1) \end{cases} \quad (2)$$

ξ1 and ξ2 satisfy formula (3), and the phase difference is π/2.

[Math. 3]

$$\begin{cases} \xi_1 = \tan^{-1}\left(\dfrac{\sin\gamma}{1+\cos\gamma}\right) = \dfrac{\gamma}{2} \\ \xi_2 = \tan^{-1}\left(\dfrac{-\sin\gamma}{1-\cos\gamma}\right) = \dfrac{\pi}{2} + \dfrac{\gamma}{2} \end{cases} \quad (3)$$

That is, regardless of the value of the phase difference γ between the first sine signal V sin 1 and the second sine signal V sin 2, which are original signals, the first detection signal V sin_det1 and the second detection signal V sin_det2 for which orthogonality is ensured can be obtained by the detection signal calculation unit 2.

An angle calculation unit 3 calculates a detection angle θ as in formula (4), for example, using the first detection signal V sin_det1 and the second detection signal V sin_det2 obtained by the detection signal calculation unit 2. Here, the detection angle θ is described in terms of a formula, but the detection angle θ may be calculated using a conversion table defined in advance. When the output result of the detection signal calculation unit 2 is used, the zero point deviates from the original zero point as shown in formula (3). Here, when correction is performed by π/2+γ/2, it is possible to obtain the same zero point as that based on the angle calculated from the first sine signal V sin 1 and the second sine signal V sin 2.

[Math. 4]

$$\theta = \tan^{-1}\left(k\dfrac{V_{sin\_det1}}{V_{sin\_det2}}\right) - \left(\dfrac{\pi}{2} + \dfrac{\gamma}{2}\right) \quad (4)$$

A coefficient k may be given according to formula (5) in consideration of the amplitude ratio in formula (2). Accordingly, a second-order angle error due to amplitude deviation can be reduced. In formula (4), a value obtained by multiplying the ratio between the first detection signal V sin_det1 and the second detection signal V sin_det2 by the coefficient k is applied in an inverse tangent function. However, either one of the first detection signal V sin_det1 and the second detection signal V sin_det2 may be multiplied by a coefficient corresponding to the amplitude ratio.

[Math. 5]

$$k = \sqrt{\dfrac{1-\cos\gamma}{1+\cos\gamma}} \quad (5)$$

Figure 3:
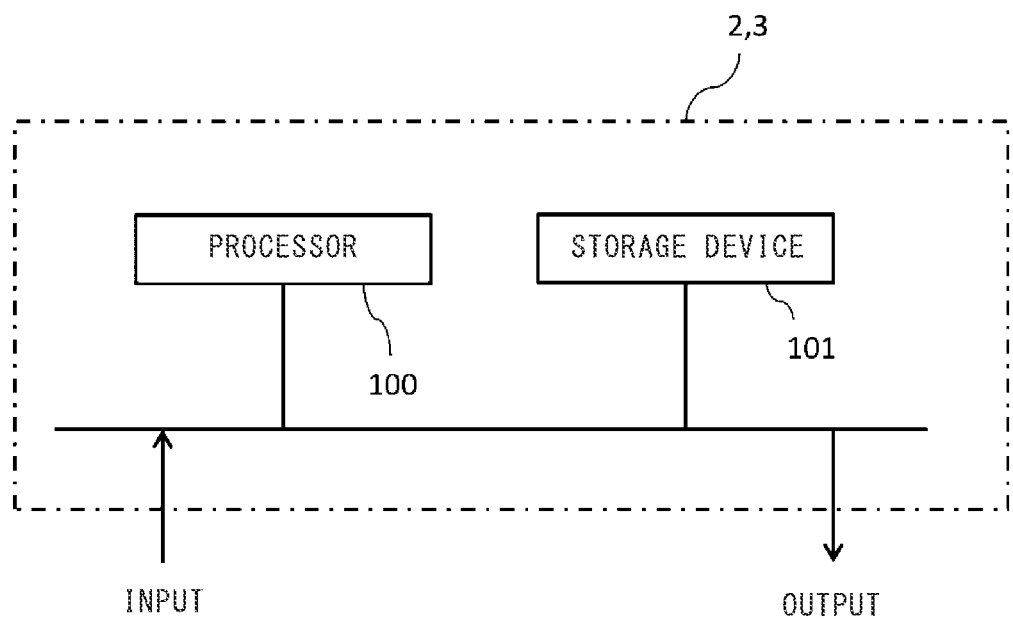
FIG. 3 shows an example of hardware of a detection signal calculation unit and an angle calculation unit in embodiment 1.

FIG. 3 shows an example of hardware of the detection signal calculation unit 2 and the angle calculation unit 3. The hardware is composed of a processor 100 and a storage device 101. Although not shown, the storage device includes a volatile storage device such as a random access memory and a nonvolatile auxiliary storage device such as a flash memory. Instead of the flash memory, a hard disk as an auxiliary storage device may be provided. By executing a program inputted from the storage device 101, the processor 100 performs detection signal calculation or angle calculation described above, for example. In this case, a program is inputted to the processor 100 from the auxiliary storage device via the volatile storage device. The processor 100 may output data such as a calculation result to the volatile storage device of the storage device 101, or may store the data in the auxiliary storage device via the volatile storage device.

Figure 4A:
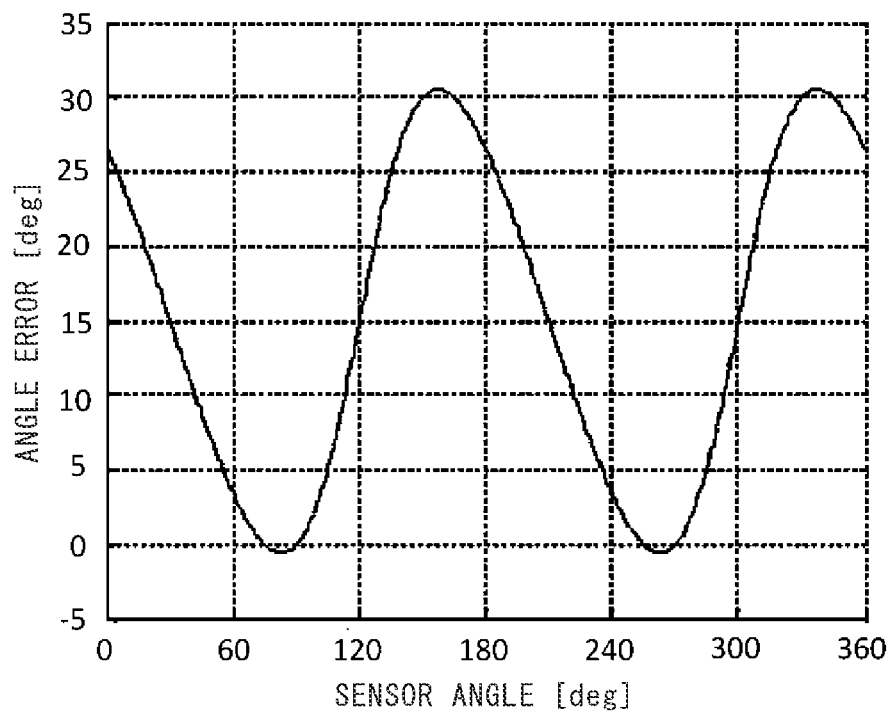
FIG. 4A and 4B show angle error when a detection angle θ is obtained based on a first sine signal and a second sine signal.
Figure 4B:
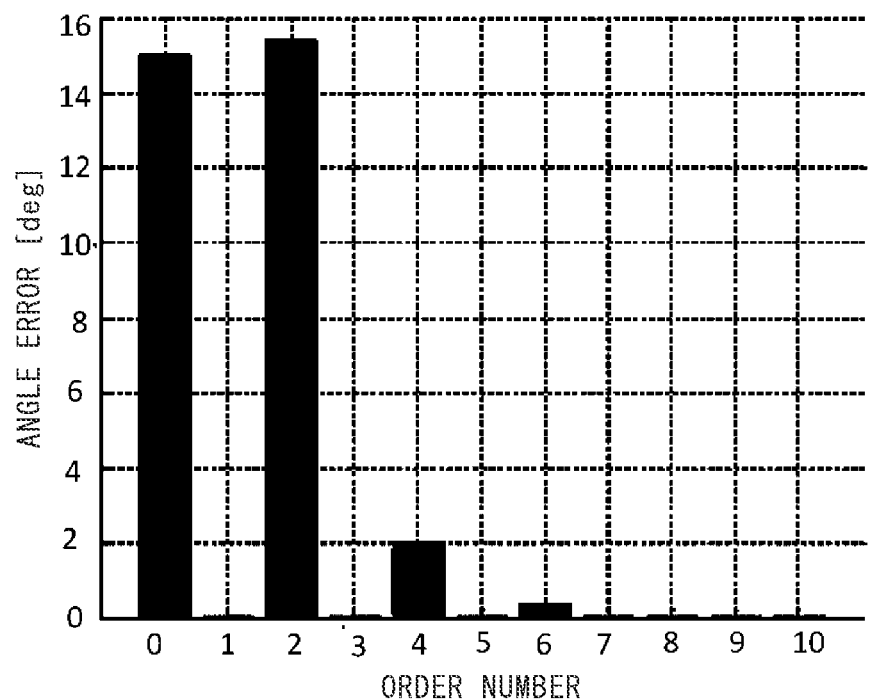

Next, as a specific example, effects of the present embodiment 1 when the phase difference γ between the first sine signal V sin 1 and the second sine signal V sin 2 is −π/3 are described. In this case, formula (1) becomes formula (6). As in formula (7), when the detection angle θ is obtained on the basis of the first sine signal V sin 1 and the second sine signal V sin 2, the angle error is in 0-order and 2n-order components as shown in FIG. 4A and 4B.

[Math. 6]

$$\begin{cases} V_{sin1} = a_1 \cos\theta_s + \dfrac{V_c}{2} \\ V_{sin2} = a_1 \cos\left(\theta_2 - \dfrac{\pi}{3}\right) + \dfrac{V_c}{2} \end{cases} \quad (6)$$

[Math. 7]

$$\theta = \tan^{-1}\left(\dfrac{V_{sin2} - \dfrac{V_c}{2}}{V_{sin1} - \dfrac{V_c}{2}}\right) \quad (7)$$

In contrast, in the case of the angle detection device of the present embodiment 1, the first detection signal V sin_det1 and the second detection signal V sin_det2 are obtained by the detection signal calculation unit 2 as represented by formula (8).

[Math. 8]

$$\begin{cases} V_{sin\_det1} = \sqrt{3}\, a_1 \cos\left(\theta_s - \dfrac{\pi}{6}\right) \\ V_{sin\_det2} = a_1 \cos\left(\theta_s - \dfrac{\pi}{3}\right) \end{cases} \quad (8)$$

The detection angle θ can be calculated by the angle calculation unit 3 according to formula (9) in which the amplitude ratio and the zero point deviation have been adjusted. That is, even in a case where the phase difference between the first sine signal V sin 1 and the second sine signal V sin 2 is not ±π/2, when an angle is calculated using the first detection signal V sin_det1 and the second detection signal V sin_det2 for which orthogonality is ensured, a sensor angle second-order angle error caused due to the phase difference deviating from π/2 can be suppressed.

[Math. 9]

$$\theta = \tan^{-1}\left(\dfrac{\sqrt{3}\, V_{sin\_det2}}{V_{sin\_det1}}\right) - \dfrac{\pi}{6} \approx \theta_s \quad (9)$$

Meanwhile, in many cases, the first sine signal V sin 1 and the second sine signal V sin 2 obtained from the angle detector are subjected to A/D conversion, to be used. For example, when 0 to 5 V is subjected to conversion at a 10 bit resolution, the minimum resolution is about 4.9 mV. When formula (6) and formula (8) are compared with each other, the amplitudes of the original signals is a1, whereas the amplitudes of the signals calculated using the sum and the difference are √3a1 and a1.

Figure 5:
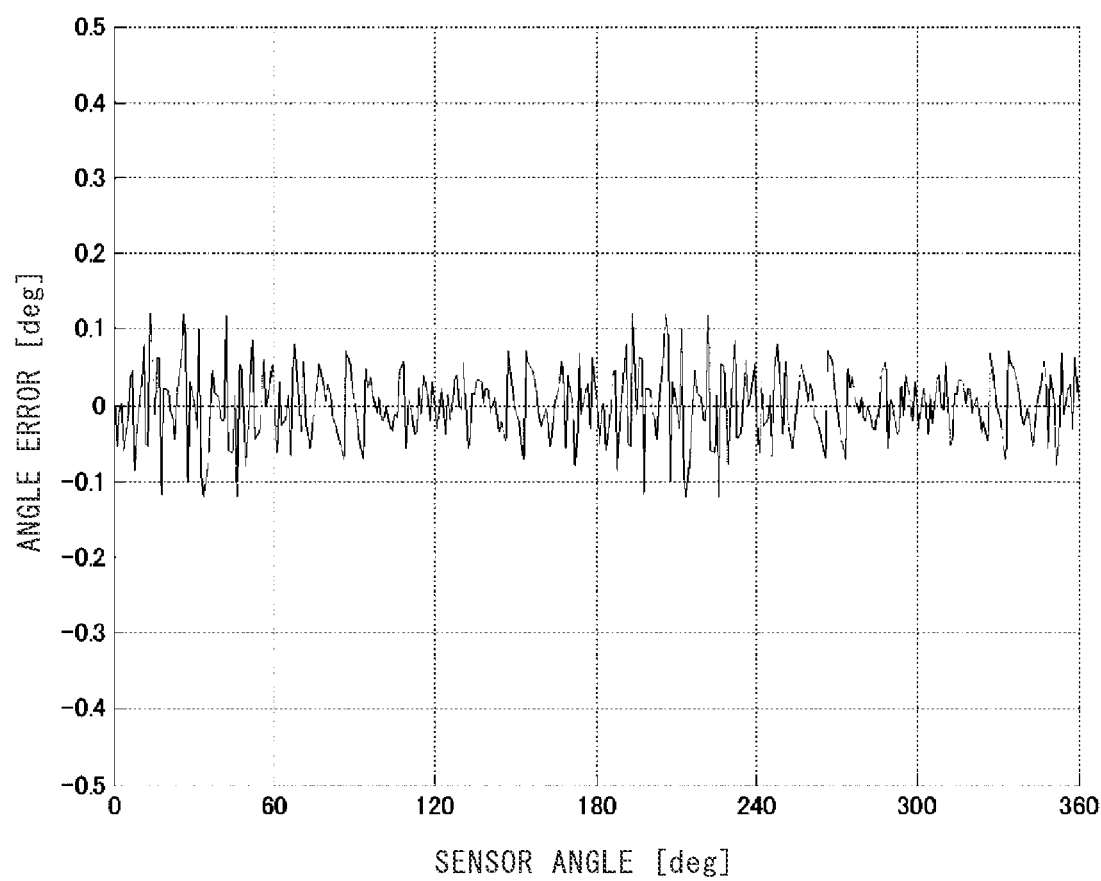
FIG. 5 shows error of detection angle obtained when 0 to 5 V is subjected to A/D conversion at a 10 bit resolution in a case where the phase difference is $-\pi/3$.

FIG. 5 shows error of the detection angle θ (sensor angle) obtained when 0 to 5 V is subjected to A/D conversion at a 10 bit resolution in a case where the amplitudes of the first detection signal V sin_det1 and the second detection signal V sin_det2 are both 2 V, and the phase difference γ therebetween is −π/3.

Figure 6:
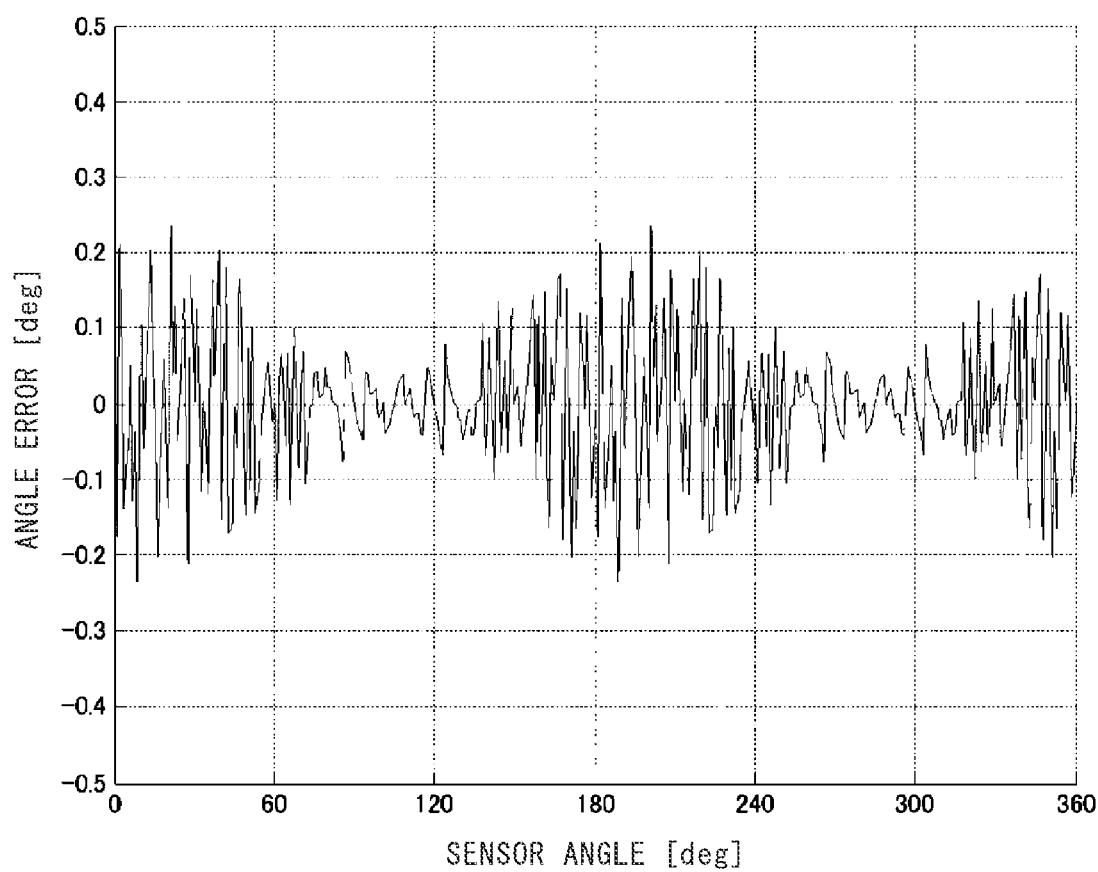
FIG. 6 shows error of detection angle obtained when 0 to 5 V is subjected to A/D conversion at a 10 bit resolution in a case where the phase difference is $-\pi/6$.

FIG. 6 shows error of the detection angle θ (sensor angle) obtained when 0 to 5 V is subjected to A/D conversion at a 10 bit resolution in a case where the amplitudes of the first detection signal V sin_det1 and the second detection signal V sin_det2 are both 2 V and the phase difference γ therebetween is −π/6. When the phase difference γ is −π/6 as in FIG. 6, the amplitude of the second detection signal V sin_det2 is smaller than the amplitude of the first sine signal V sin 1 and the second sine signal V sin 2, which are the original signals, whereby the accuracy decreases, and accordingly, the angle error increases.

A condition for the amplitudes of the first detection signal and the second detection signals to be both greater than or equal to the amplitudes of the original signals is formula (9-1), on the basis of formula (1) and formula (2).

[Math. 10]

$$\begin{cases} \sqrt{2}\,\sqrt{1+\cos\gamma} \geq 1 \\ \sqrt{2}\,\sqrt{1-\cos\gamma} \geq 1 \end{cases} \quad (9\text{-}1)$$

When this is solved, formula (9-2) is obtained.

[Math. 11]

$$-\tfrac{1}{2} \leq \cos\gamma \leq \tfrac{1}{2} \quad (9\text{-}2)$$

That is, when the phase difference between the first sine signal V sin 1 and the second sine signal V sin 2 is not less than π/3 and not greater than ⅔π, the amplitudes of the first detection signal V sin_det1 and the second detection signal V sin_det2 are prevented from becoming smaller than those of the first sine signal V sin 1 and the second sine signal V sin 2, which are the original signals. Accordingly, decrease in accuracy due to the resolution of A/D conversion can be suppressed. This is an effect that has not been realized in conventional art.

Figure 7:
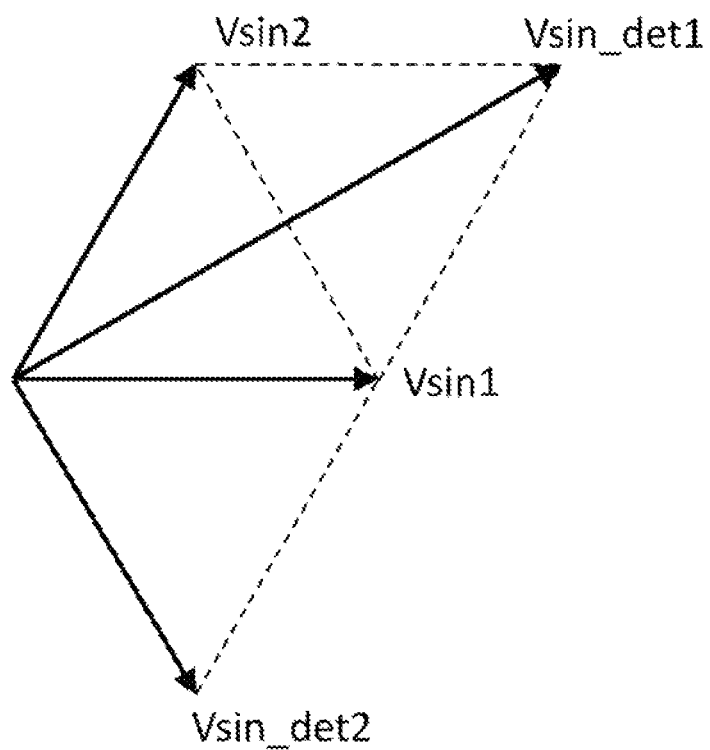
FIG. 7 shows a first sine signal and a second sine signal, and a first detection signal and a second detection signal in terms of a vector diagram.

When this is expressed by vectors as shown FIG. 7, changes in the amplitude and the phase are easily understood. The first sine signal V sin 1 and the second sine signal V sin 2 are vectors whose phases are different by π/3. Therefore, the second detection signal V sin_det2, which is the difference between the vectors, is a side of an equilateral triangle. This has a magnitude equal to those of the vectors of the first sine signal V sin 1 and the second sine signal V sin 2, which are the original signals. When the phase difference between the first sine signal V sin 1 and the second sine signal V sin 2 is smaller than π/3, the amplitude of the first detection signal V sin_det1 represented by the sum of the first sine signal V sin 1 and the second sine signal V sin 2 increases, whereas the amplitude of the second detection signal V sin_det2 represented as the difference between the first sine signal V sin 1 and the second sine signal V sin 2 decreases.

When the phase difference between the first sine signal V sin 1 and the second sine signal V sin 2 is greater than $\pi/3$, the amplitude of the first detection signal V sin_det1 represented by the sum of the first sine signal V sin 1 and the second sine signal V sin 2 becomes smaller than when the phase difference is $\pi/3$, but is greater than the amplitudes of the first sine signal V sin 1 and the second sine signal V sin 2, which are the original signals, whereas the amplitude of the second detection signal V sin_det2 represented by the difference between the first sine signal V sin 1 and the second sine signal V sin 2 becomes greater than when the phase difference is $\pi/3$, and becomes greater than the amplitudes of the first sine signal V sin 1 and the second sine signal V sin 2, which are the original signals.

When the phase difference between the first sine signal V sin 1 and the second sine signal V sin 2 is $\pi/2$, the amplitude of the first detection signal V sin_det1 and the amplitude of the second detection signal V sin_det2 become equal to each other. Further, when the phase difference between the first sine signal V sin 1 and the second sine signal V sin 2 is greater than $\pi/2$, the amplitude of the second detection signal V sin_det2 represented by the difference between the first sine signal V sin 1 and the second sine signal V sin 2 becomes further greater, whereas the amplitude of the first detection signal V sin_det1 represented by the sum of the first sine signal V sin 1 and the second sine signal V sin 2 becomes further smaller.

Then, when the phase difference exceeds $2/3\pi$, the amplitude of the first detection signal V sin_det1 becomes smaller than those of the first sine signal V sin 1 and the second sine signal V sin 2, which are the original signals.

In formula (4) above, description has been given without taking an error due to fixed-point calculation into consideration. When multiplication of a correction coefficient is performed such that a signal having a large amplitude suits the amplitude of a signal having a small amplitude, cancellation of significant digits occurs and the accuracy is deteriorated. When correction is performed by multiplying the signal having the smaller amplitude by a correction coefficient that is not less than 1 based on the amplitude ratio, an angle error due to amplitude deviation can be reduced while preventing deterioration of the accuracy caused when multiplication by a correction coefficient is performed.

When the phase difference is $\pi/3$ or $2/3\pi$, the amplitude of either the first detection signal V sin_det1 or the second detection signal V sin_det2 becomes equal to the amplitudes of the first sine signal V sin 1 and the second sine signal V sin 2, which are the original signals. Therefore, decrease in accuracy due to the resolution of A/D conversion caused by decrease in amplitude can be suppressed. Although the phase difference between the first sine signal V sin 1 and the second sine signal V sin 2, which are the original signals, is greatly deviated from $\pi/2$, when the angle calculation method based on the first detection signal and the second detection signal having orthogonality described in the present embodiment is used, the second-order angle error caused due to the phase difference deviation can be reduced by a simple configuration. For example, when the phase difference between the first sine signal V sin 1 and the second sine signal V sin 2 is $\pi/3$ as shown in FIG. 7, the second detection signal having the smaller amplitude may be multiplied by a correction coefficient that is not less than 1.

Embodiment 2

When the phase difference is $\pi/2$, the amplitudes of the first detection signal V sin_det1 and the second detection signal V sin_det2 are both $\sqrt{2}$ times the amplitudes of the first sine signal V sin 1 and the second sine signal V sin 2, which are the original signals. Therefore, decrease in accuracy due to the resolution of A/D conversion can be suppressed, and at the same time, the phase difference deviation of the first sine signal V sin 1 and the second sine signal V sin 2, which are the original signals, can be replaced with an amplitude ratio deviation of the first detection signal V sin_det1 and the second detection signal V sin_det2. This effect is described with reference to an example case where the first sine signal V sin 1 and the second sine signal V sin 2 are given as in formula (10).

[Math. 12]

$$\begin{cases} V_{sin1} = a_0 + a_1\cos\theta_s \\ V_{sin2} = c_0 + c_1\cos\theta_s + d_1\sin\theta_s \end{cases} \quad (10)$$

Although the amplitude of the first sine signal V sin 1 is a1, the amplitude of the second sine signal V sin 2 is $$\sqrt{c_1^2 + d_1^2} \quad \text{[Math. 13]}$$

and thus, the amplitude ratio is not 1. In this state, when the first detection signal V sin_det1 and the second detection signal V sin_det2 are calculated, the phase difference between the two signals is deviated from $\pi/2$.

The amplitude of the first detection signal V sin_det1 can be calculated by, for example, subtracting the minimum value of the signal from the maximum value thereof and dividing the resultant value by 2. An offset a0 can be calculated by using, for example, the average value in one cycle of the signal or the average of the maximum value and the minimum value of the signal. Similarly, the amplitude of the second detection signal V sin_det2 can be calculated by, for example, subtracting the minimum value of the signal from the maximum value thereof, and dividing the resultant value by 2. An offset c0 can be calculated by using, for example, the average value in one cycle of the signal or the average of the maximum value and the minimum value of the signal. When the amplitude ratio is not 1, or when the offsets of the two signals are different, correction according to formula (11) may be performed in the detection signal calculation unit 2. Accordingly, the first-order angle error due to the offset error can be reduced. Even when the offset a0 and the offset c0 are not very small values, such as Vc/2 in formula (1), the offsets are adjusted before the amplitude correction, and thus, the first order angle error can be suppressed.

[Math. 14]

$$\begin{cases} V_{sin1\_hosei} = \dfrac{\sqrt{c_1^2 + d_1^2}}{a_1}(V_{sin1} - a_0) \\ V_{sin2\_hosei} = V_{sin2} - c_0 \end{cases} \quad (11)$$

When the first detection signal V sin_det1 and the second detection signal V sin_det2 are calculated in formula (12) using correction signals V sin 1_hosei and V sin 2_hosei calculated in formula (11), two signals of which the phase difference is $\pi/2$ can be obtained.

[Math. 15]

$$\begin{cases} V_{sin\_det1} = V_{sin1\_hosei} + V_{sin2\_hosei} \\ V_{sin\_det2} = V_{sin1\_hosei} - V_{sin2\_hosei} \end{cases} \quad (12)$$

Since the amplitude ratio between the first detection signal V sin_det1 and the second detection signal V sin_det2 is not 1, if the ratio between the amplitude obtained by subtracting the minimum value of the first detection signal V sin_det1 from the maximum value thereof and the amplitude obtained by subtracting the minimum value of the second detection signal V sin_det2 from the maximum value thereof is used as the coefficient k of formula (4), correction can be performed when the detection angle θ is calculated in the angle calculation unit 3. Accordingly, the second-order angle error can be suppressed.

When the phase difference is corrected, the phase difference needs to be calculated from the relationship between two signals. Thus, the phase difference is difficult to be calculated using a single signal. Meanwhile, when the amplitude is corrected, the amplitude can be obtained from each signal. Thus, the correction value can be easily updated online, and is not limited to using adjustment values written in an EEPROM in advance.

In formula (11) and formula (12), the offsets are corrected using the first sine signal V sin 1 and the second sine signal V sin 2. However, the offsets may be corrected using the first detection signal V sin_det1 and the second detection signal V sin_det2. In this case, the amplitude ratio between the first sine signal V sin 1 and the second sine signal V sin 2 is set to 1 in formula (13). At this time, the offset a0 of the first sine signal V sin 1 is multiplied by a correction coefficient, but the product of error can be approximated to be very small as in formula (14).

[Math. 16]

$$\begin{cases} V_{sin1\_hosei} = \dfrac{\sqrt{c_1^2 + d_1^2}}{a_1} V_{sin1} \\ V_{sin2\_hosei} = V_{sin2} \end{cases} \quad (13)$$

[Math. 17]

$$V_{sin1\_hosei} = \dfrac{\sqrt{c_1^2 + d_1^2}}{a_1} a_1 \cos\theta_s - \left\{ 1 + \left( \dfrac{\sqrt{c_1^2 + d_1^2}}{a_1} - 1 \right) \right\} a_0 \quad (14)$$

$$\approx \dfrac{\sqrt{c_1^2 + d_1^2}}{a_1} a_1 \cos\theta_s - a_0$$

Therefore, with respect to the first detection signal V sin_det1 and the second detection signal V sin_det2, the offsets can be corrected according to formula (15).

[Math. 18]

$$\begin{cases} V_{sin\_det1} = V_{sin1\_hosei} + V_{sin2\_hosei} - (a_0 + c_0) \\ V_{sin\_det2} = V_{sin1\_hosei} - V_{sin2\_hosei} - (a_0 - c_0) \end{cases} \quad (15)$$

Here, the effects of offset correction and amplitude ratio correction have been described in a case where the phase difference is π/2. However, it is understood that the same effects can also be obtained in a case where the phase difference has another value.

Embodiment 3

In embodiment 1 above, description has been given for a method for suppressing the second-order angle error caused due to a phase difference deviation of the first sine signal V sin 1 and the second sine signal V sin 2, by calculating a detection angle by using the first detection signal V sin_det1 obtained from the sum of the first sine signal V sin 1 and the second sine signal V sin 2 and the second detection signal V sin_det2 obtained from the difference between the first sine signal V sin 1 and the second sine signal V sin 2. In the present embodiment 3, a failure determination method is described.

Figure 8:
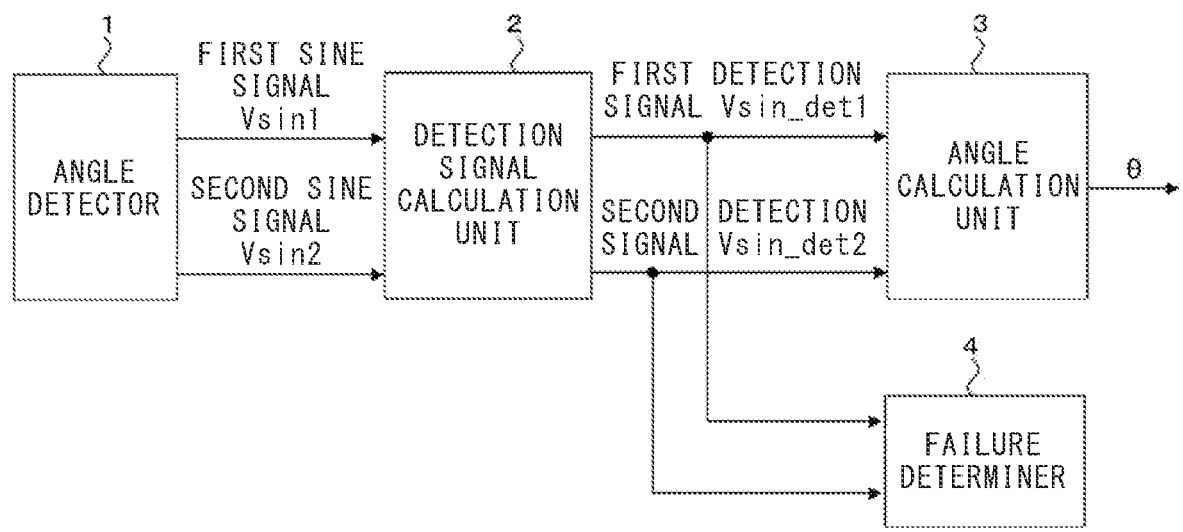
FIG. 8 is a block configuration diagram showing a configuration of an angle detection device according to embodiment 3.

FIG. 8 is a block configuration diagram showing a configuration of an angle detection device in the present embodiment 3. A failure determiner 4 is added to FIG. 2. The failure determiner 4 determines a failure using a sum of squares or a square root of sum of squares of the first detection signal V sin_det1 and the second detection signal V sin_det2. In the following, determination using the sum of squares is described, but the same effect can be obtained also in the case of the square root of sum of squares. Similar to embodiment 1, the hardware of the failure determiner may be composed of the processor 100 and the storage device 101.

Figure 9:
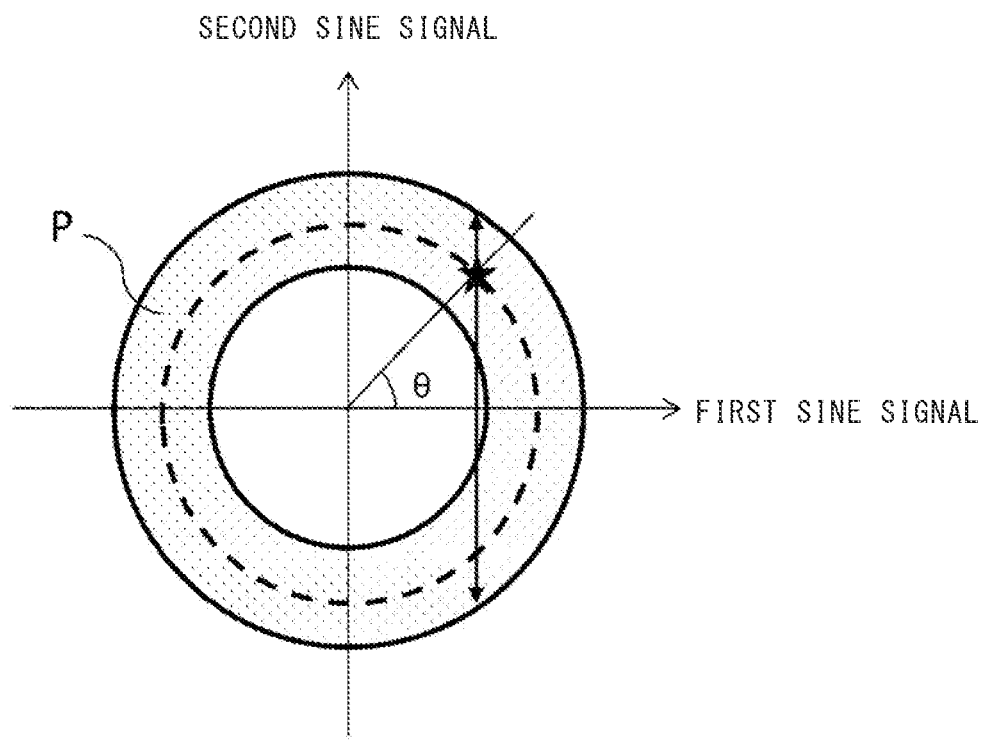
FIG. 9 shows a normal range of an angle detection device in one cycle of sensor angle when the phase difference between the first sine signal and the second sine signal is $\pi/2$.
Figure 10:
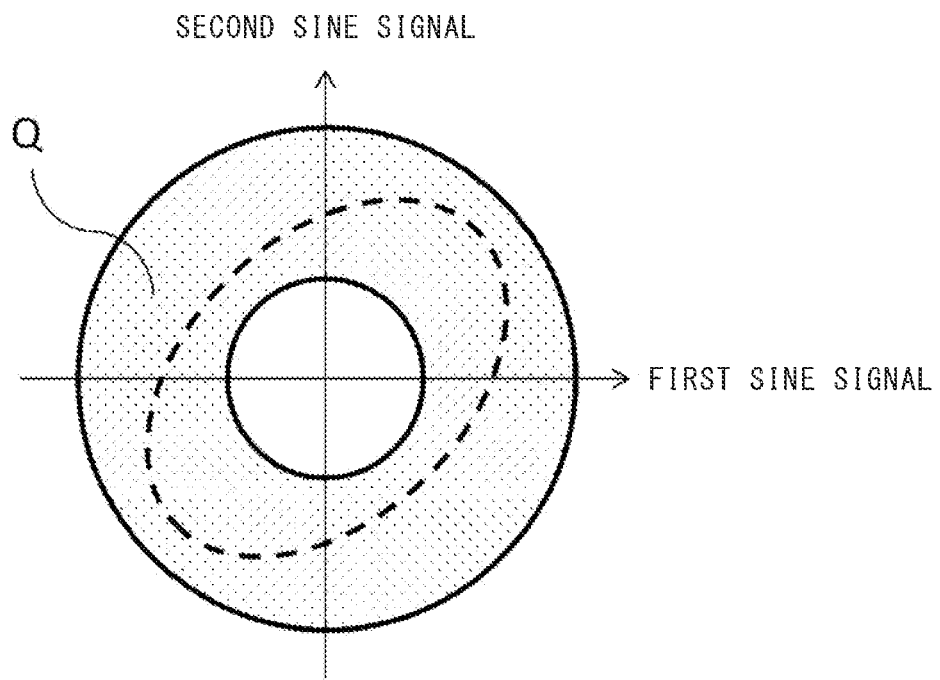
FIG. 10 shows a normal range of the angle detection device in one cycle of sensor angle when the phase difference between the first sine signal and the second sine signal is $\pi/3$.

In a case where the phase difference between the first sine signal V sin 1 and the second sine signal V sin 2 is π/2, when the horizontal axis represents the first sine signal V sin 1 and the vertical axis represents the second sine signal V sin 2, a circular trajectory indicated by a broken line as in FIG. 9 is ideally realized in one cycle of sensor angle. Since the amplitude of each signal is changed due to temperature or varies due to aged deterioration, the hatched area is defined as a normal range P, and being outside the normal range P is determined as a failure. The radius of the inner circle represents a lower limit threshold, the radius of the outer circle represents an upper limit threshold, and a star mark represents a state immediately before a failure. When an abnormality has occurred in a sine wave signal, the sine wave signal changes within the range indicated by an arrow. The range indicated by the arrow has a portion that is outside the hatched part, and a failure is determined in this portion. This method uses a feature that, when the orthogonality between two signals is ensured, the sum of squares is constant. However, when the phase difference is not π/2, for example, the phase difference is π/3, a slanted ellipsoid trajectory is obtained as shown in FIG. 10. With respect to the slanted ellipsoid trajectory, when a normal range Q is set in consideration of change in temperature and variation due to aged deterioration, a significantly larger range when compared with that in FIG. 9 is obtained. This causes a situation where a failure cannot be determined even when a failure should be determined.

A case where the first sine signal V sin 1 and the second sine signal V sin 2 are given by formula (6) described in embodiment 1 is described. According to formula (6), a sum of squares Vsum of the first sine signal and the second sine signal varies at the sensor angle second order as in formula (16).

[Math. 19]

$$V_{sum} = \left(V_{sin1} - \frac{V_c}{2}\right)^2 + \left(V_{sin2} - \frac{V_c}{2}\right)^2 = \frac{a_1^2}{2}\{2 + \cos(2\theta_s - \frac{\pi}{3})\} \quad (16)$$

When the sum of squares Vsum is calculated using the first detection signal V sin_det1 and the second detection signal V sin_det2 in formula (8), the sum of squares Vsum varies at the sensor angle second order as in formula (17).

[Math. 20]

$$V_{sum} = V_{sin1\_det}^2 + V_{sin2\_det}^2 = a_1^2\{2 + \cos(2\theta_s - \frac{\pi}{3})\} \quad (17)$$

The variation component in formula (16) is caused because the phase difference between the first sine signal V sin 1 and the second sine signal V sin 2 is not $\pi/2$, whereas the variation component in formula (17) is caused because the amplitudes of the first detection signal V sin_det1 and the second detection signal V sin_det2 are different. In order to suppress the variation component in formula (16), the phase needs to be changed. However, in order to suppress the variation component in formula (17), the amplitude only needs to be adjusted as in formula (18).

[Math. 21]

$$V_{sum} = V_{sin1\_det}^2 + (\sqrt{3}V_{sin2\_det})^2 = 3a_1^2 \quad (18)$$

That is, regardless of the phase difference between the first sine signal V sin 1 and the second sine signal V sin 2, if the amplitude of at least one of the first detection signal V sin_det1 or the second detection signal V sin_det2 is corrected and the sum of squares is calculated, a circular trajectory when the phase difference is $\pi/2$ as in FIG. 9 can be obtained to be used in failure determination. This is an effect that has not been realized in conventional art. This eliminates the need of taking deviation due to phase difference into consideration, and thus, facilitates designing of a determination threshold.

Although the present disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 angle detector
2 detection signal calculation unit
3 angle calculation unit
4 failure determiner
100 processor
101 storage device

The invention claimed is:

1. An angle detection device comprising:
an angle detector for detecting a first sine signal and a second sine signal having a phase different from that of the first sine signal, in accordance with rotation of a rotating machine, wherein a DC voltage is supplied to the angle detector;
a storage device and a processor, wherein the processor comprises:
a detection signal calculator to determine a subtraction term as the DC voltage supplied to the angle detector when the DC voltage is twice a midpoint potential of the first sine signal, update the subtraction term online based on an environmental temperature and an aged deterioration of the angle detection device when the DC voltage is not twice the midpoint potential of the first sine signal, output a first detection signal by subtracting the subtraction term from a sum of the first sine signal and the second sine signal, and a second detection signal based on a difference between the first sine signal and the second sine signal, wherein the first detection signal is orthogonal to the second detection signal; and
an angle calculator to calculate a detection angle on the basis of the first detection signal and the second detection signal, wherein
a second-order angle error caused due to a phase difference between the first sine signal and the second sine signal deviating from $\pi/2$ is suppressed, based on the first detection signal orthogonal to the second detection signal,
wherein the processor of the angle detection device is configured to control a motor of the rotating machine based on the detection angle.

2. The angle detection device according to claim 1, wherein
an angle detection value calculated in the angle calculator is calculated by subtracting,
from an angle obtained through an inverse tangent function of a ratio between the first detection signal and the second detection signal,
a value that is ½ of the phase difference between the first sine signal and the second sine signal, or a value obtained by adding $\pi/2$ to ½ of the phase difference between the first sine signal and the second sine signal.

3. The angle detection device according to claim 1, wherein
at least one of the first sine signal or the second sine signal is corrected such that an amplitude ratio between the first sine signal and the second sine signal is 1.

4. The angle detection device according to claim 1, wherein
the first sine signal is corrected through subtraction of a first offset correction value, and the second sine signal is corrected through subtraction of a second offset correction value.

5. The angle detection device according to claim 1, further comprising
a failure determiner to determine a failure of the angle detector, wherein
the failure determiner determines a failure using a sum of squares or a square root of sum of squares of the first detection signal and the second detection signal.

6. The angle detection device according to claim 1, wherein at least one of the first detection signal or the second detection signal is multiplied by a correction coefficient based on an amplitude ratio, so as to be corrected.

7. The angle detection device according to claim 1, wherein a signal having a smaller amplitude out of the first detection signal and the second detection signal is multiplied by a correction coefficient that is not less than 1 based on an amplitude ratio, so as to be corrected.

8. The angle detection device according to claim 1, wherein the phase difference between the first sine signal and the second sine signal is not less than $\pi/3$ and not greater than $2/3\pi$.

9. The angle detection device according to claim 1, wherein the phase difference between the first sine signal and the second sine signal is x/2.

10. The angle detection device according to claim 1, wherein the phase difference between the first sine signal and the second sine signal is x/3 or 2/3x.

11. The angle detection device according to claim 1, wherein the angle detector is any one of a resolver, a sensor using magnetic resistance, an encoder, or a Hall element.

* * * * *